J. Wilkinson,
Animal Tether.
Nº 78,631.    Patented June 2, 1868.
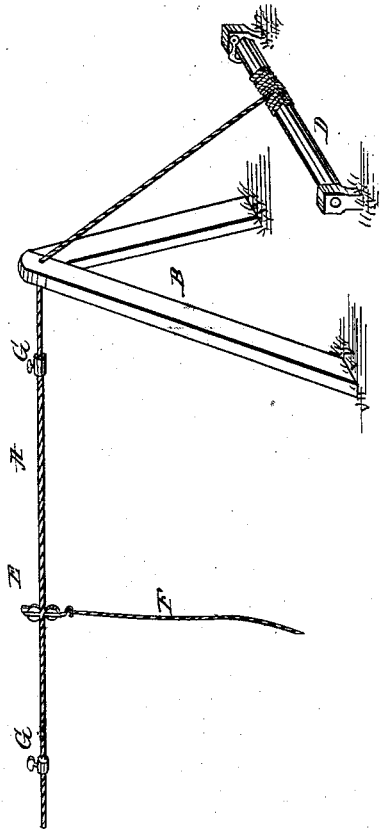
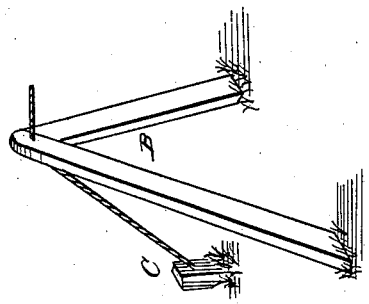
Witnesses
Geo. W. Wood
Chas. F. Clausen
Jose Wilkinson
Inventor
by H. Holloway his Atty

United States Patent Office.

JESSE WILKINSON, OF URBANA, ILLINOIS, ASSIGNOR TO HORACE BALLARD WILKINSON, OF SAME PLACE.

*Letters Patent No. 78,631, dated June 2, 1868.*

IMPROVEMENT IN HERDING AND SECURING CATTLE.

*The Schedule referred to in these Letters Patent and making part of the same.*

TO ALL WHOM IT MAY CONCERN:

Be it known that I, JESSE WILKINSON, of Urbana, in the county of Champaign, and State of Illinois, have invented a new and useful Improvement in Herders for Securing Cattle when Feeding; and I do hereby declare that the following is a full, clear, and exact description of the same, reference being had to the annexed drawings, making part of this specification, in which it is shown in perspective.

My improvement consists in attaching the halters of cattle, &c., to a sheave which runs upon a taut rope, so that they may feed within limits governed by adjustable stops attached to said rope, the rope being stretched by a windlass, so that the posts or trestles sustaining the rope may be held in position by the tension hereof, by which means I am enabled to set up the herder easily, and to conveniently remove it from place to place in the pasture.

In the annexed drawings, A is a rope raised above the height of the cattle upon the trusses B B, and fastened at one end to a post, C, and at the other to a windlass, D, by which it may be tightened. The double-sheaved block E runs freely along the rope, and to it is secured the halter F. The movement of the animal along the length of the rope is limited by adjustable blocks G attached to the rope by set-screws, so that any number of animals that may be fastened to the rope may be allowed an equal range.

The post holding the end of the rope is inserted in the ground by driving; the trestles rest upon the ground, and are held in place by the tension of the rope. The whole apparatus may be readily removed from one part of the pasture to another, in which respect it is distinguished from others that have been used, which, being supported on permanent posts, can only be used for feeding cattle in one place, and are not adaptable for pasturing them. I only claim the peculiar features of my arrangement which render my herder fit for use in pasturing cattle.

What I claim as my invention and desire to secure by Letters Patent, is—

The combination of the windlass for stretching the rope D, the said rope, the post C, and trusses B B, resting upon the ground, together with the traversing-block and pulley E, and adjustable stops G, substantially as and for the purpose set forth.

In testimony whereof, I have signed my name to this specification in the presence of two subscribing witnesses.

JESSE WILKINSON.

Witnesses:
W. G. BROWN,
J. H. WOODMANSEE.